United States Patent [19]
Irie et al.

[11] Patent Number: 5,734,450
[45] Date of Patent: Mar. 31, 1998

[54] ACTIVE-MATRIX SUBSTRATE AND A DEFECT CORRECTING METHOD THEREOF

[75] Inventors: Katsumi Irie, Kashihara; Yuuichirou Mochizuki, Nara; Takafumi Hayama; Tsuyoshi Nagai, both of Tenri; Hiroshi Shibuya, Osaka, all of Japan

[73] Assignee: Sharp Kabushiki Kaisha, Osaka, Japan

[21] Appl. No.: 606,400

[22] Filed: Feb. 23, 1996

[30] Foreign Application Priority Data

Mar. 17, 1995 [JP] Japan ................... 7-058979
Aug. 10, 1995 [JP] Japan ................... 7-204859

[51] Int. Cl.$^6$ ............ G02F 1/1343; G02F 1/13; G01R 31/00
[52] U.S. Cl. ............ 349/39; 349/55; 349/192; 324/770
[58] Field of Search ............ 349/39, 55, 192; 324/770

[56] References Cited

U.S. PATENT DOCUMENTS

| | | | |
|---|---|---|---|
| 4,840,459 | 6/1989 | Strong | 349/55 |
| 5,124,816 | 6/1992 | Yoshihara et al. | 349/192 |
| 5,159,477 | 10/1992 | Shimada et al. | 349/39 |
| 5,335,102 | 8/1994 | Kanemori et al. | 349/42 |
| 5,394,258 | 2/1995 | Morin et al. | 349/38 |
| 5,506,516 | 4/1996 | Yamashita et al. | 324/770 |
| 5,532,615 | 7/1996 | Kondo et al. | 324/770 |
| 5,576,730 | 11/1996 | Shimada et al. | 324/770 |
| 5,608,558 | 3/1997 | Katsumi | 349/192 |

FOREIGN PATENT DOCUMENTS

| | | | |
|---|---|---|---|
| 0457670 | 11/1991 | European Pat. Off. | 349/38 |
| 3-212620 | 9/1991 | Japan | 349/55 |
| 5-2175 | 1/1993 | Japan. | |
| 5-2176 | 1/1993 | Japan. | |
| 5-2180 | 1/1993 | Japan. | |

*Primary Examiner*—Anita Pellman Gross
*Attorney, Agent, or Firm*—Nixon & Vanderhye P.C.

[57] ABSTRACT

Common lines are formed in parallel with gate lines. A line which joins those parallel lines is provided in parallel with source lines on the substrate edge part on the gate line terminals side. Another line which joins the same parallel lines is provided in parallel with source lines on the substrate edge part on the opposite side of the gate line terminals. These two terminals are supplied with a signal which is identical with the common signal being applied to an opposing electrode. Depressed portions are provided for each pixel electrode at positions where the source line and common line intersect with each other or in the vicinity of the source line on both sides thereof.

10 Claims, 4 Drawing Sheets

5,734,450

ACTIVE-MATRIX SUBSTRATE AND A DEFECT CORRECTING METHOD THEREOF

BACKGROUND OF THE INVENTION

(1) Field of the Invention

The present invention relates to an active-matrix substrate wherein a plurality of pixel electrodes as well as switching elements for driving the pixel electrodes are arranged matrix-wise. The invention also relates to a defect correcting method for the active-matrix substrate.

(2) Description of the Prior Art

In recent years, flat type display panels such as liquid crystal display devices and the like have been widely used. Of these display panels, particularly, active-matrix type display panels have been used for those needing a great number of electrodes to meet demand for development to high-definition such as for television screens.

For example, an active-matrix type liquid crystal panel has a structure in which a liquid crystal is sealed between an active-matrix substrate with pixel electrodes formed thereon and an opposing substrates. FIG. 1 is an equivalent circuit diagram corresponding to a conventional active-matrix substrate. FIG. 2 is an enlarged configurational view showing this active-matrix substrate. Formed on the surface of the active-matrix substrate are gate lines 1, gate line terminals 1a, source lines 2, source line terminals 2a, common lines 3, common line terminals thin-film transistors 4 and pixel electrodes 5. The gate lines 1 and source lines 2 are disposed matrix-wise with an insulator film interposed therebetween. Provided at each of the intersections is a thin-film transistor 4 functioning as a switching device. In the thin-film transistor 4, the gate line 1 and source line 2 are connected to its gate electrode 41 and source electrode 42, respectively while its drain electrode 43 is connected to a pixel electrode 5. The common lines 3 are formed in parallel with the gate lines 1 and are connected together to a joint line which is formed on the gate terminal 1a side in parallel with the source lines 2. The common lines 3 intersect the gate lines 1, source lines 2 and pixel electrodes 5 with an insulator film interposed between the layers.

In high-definition type liquid crystal display panels, the area of each pixel electrode 5 is small, therefore liquid crystal capacitance (designated at 7) is not enough to provide a stabilized display. For this reason, an auxiliary capacitance 8 is formed in each element as shown in FIG. 1 such that one terminal is connected to the common line 3 and the other terminal is connected to the drain electrode 43 of the thin-film transistor 4, whereby it is possible to create capacitance several times greater than the liquid crystal capacitance 7, thus making it possible to obtain a stabilized display. In practice, as shown in FIG. 2, the common lines 3 are disposed under the pixel electrodes and adapted to intersect the pixel electrodes with an insulator film interposed therebetween. Thus formed intersections function as auxiliary capacitance, to which the same signal with the common signal impressed to the opposing electrode is applied.

However, the following problem occurs due to the provision of the common lines stated above. As shown in FIG. 2, there are occasions that a film forming failure arises in the intersection between the source line 2 and the common line 3 to cause a short circuit there between, thus forming a defective site 10. Since through this short circuit the potential applied to the source line 2 is affected by the potential applied to the common line 3, a line defect occurs along the direction of the source line 2 on the display panel. Further, since the potential applied to the common line 3 is affected by the potential applied to the source line 2, another line defect occurs along the direction of the common line 3. That is, a cross defect having the defective site 10 as its intersection occurs on the display panel.

One of the methods of correcting such defects is to provide redundant wires as spare lines. In the active-matrix substrate, redundant wires are formed on, for example, the opposite side of the source line terminals 2a, in parallel with the gate lines 1 and arranged matrix-wise relative to the source lines 2 with an insulator film interposed between the layers. If a defect is found at a site 10, the source line 2 is cut off at both sides of the defect site 10 with a laser beam, and the intersection between the source line 2 and one of the redundant wires is irradiated with a laser beam to thereby connect the source line 2 with the redundant wire. The defective part is supplied with the signal from both sides of the thus cut source line 2 through the redundant wire, to thereby correct the display defect.

Nevertheless, in general, the space in which such redundant wire can be formed is limited, so that the number of wires has a limit. Accordingly, when there are several defective sites, it becomes difficult for this method to correct all the defects.

There is another case where a defective site 12 arises as shown in FIG. 2 due to a short circuit formed by film-forming failure in an intersection between a pixel electrode 5 and the common line 3. This short circuit causes the potential applied to the pixel electrode 5 to be equipotential with that applied to the common line 3. Since the same common signal is applied to both the common line 3 and the opposing electrode, the pixel electrode 5 and the opposing electrode 6 will have the same potential. Consequently, the active-matrix type display panel, if it is driven in the light-transmissive mode (to be referred to as normally-white mode), presents a bright spot at the area of the pixel electrode 5 while the panel presents a dark spot if it is driven in the light-blocking mode (to be referred to as normally-black mode).

In general, point defects due to the operation failure of thin-film transistors 4 or other short circuits are corrected when the panel is driven to display after the driver is provided. That is, in the finished state of the panel, the defects are corrected so as not to stand out. This method is carried out by cutting off the gate electrode of a thin-film transistor 4 in question with a laser beam or the like and connecting the source electrode and drain electrode of the thin-film transistor 4 (this method will be referred to as source-drain connecting correction).

However, if the source-drain connecting correction is done when the pixel electrode 5 and the common line 3 are short-circuited, the source line 2 and the common line 3 will be short-circuited due to the short circuit between the source line and the pixel electrode 5. As a result, a line defect arises on the display as stated above. Accordingly, when the common line 3 and the pixel electrode 5 were short-circuited, it was impossible to perform the source-drain connecting correction.

Further, in order to facilitate the source-drain connecting correction in the case of the point defects due to the operation failure of thin-film transistors 4, a narrow part 44 as to be a cutting portion for correction is provided in each thin-film transistor 4 between the gate electrode 41 and gate line 1, as shown in FIG. 2. This enables easy correction of the point defects, but the pixel electrode 5 is reduced in its area by the size corresponding to the narrow part 44 of the gate electrode. Therefore, the conventional active matrix of this type suffered from the reduction in its numerical aperture.

SUMMARY OF THE INVENTION

In view of the above problems, it is therefore an object of the present invention to provide an active-matrix substrate which allows correction of short-circuited defects between common lines and source lines or pixel electrodes whereby it is possible to improve the ratio of non-defective products as well as to provide a defect correcting method for the active-matrix substrate.

It is another object of the invention to provided an active-matrix substrate in which spot defects can be corrected and the numerical aperture can be improved as well as to provide a defect correcting method for the active-matrix substrate.

In accordance with a first aspect of the invention, an active-matrix substrate includes: a plurality of pixel electrodes each having a switching element for driving the pixel electrode, the pixel electrodes being arranged matrix-wise; a plurality of gate lines and source lines arranged grid-wise so as to be connected to gate and source electrodes, respectively, of the switching elements; and a plurality of common lines disposed to intersect the gate lines, source lines or pixel electrodes and to form auxiliary capacitance in cooperation with a corresponding pixel electrode so that the common signal is inputted through the capacitance, and is constructed such that the common lines are joined in both ends to respective terminals to which the common signal is inputted.

In accordance with a second aspect of the invention, a defect correcting method include the step of: in the active-matrix substrate having the above first feature, cutting a common line having a defect due to a short circuit between the common line and a gate or source line, at both sides of the defect site.

In accordance with a third aspect of the invention, a defect correcting method includes the steps of: in the active-matrix substrate having the above first feature, cutting a common line having a defect due to a short circuit between the common line and a pixel electrode, at both sides of the defect site; cutting the Gate electrode of the switching element; and connecting the source electrode and drain electrode.

A fourth aspect of the invention resides in an active-matrix substrate having the above first feature wherein depressed portions are provided for each of the pixel electrodes at positions thereof intersecting with a common line.

In accordance with a fifth aspect of the invention, a defect correcting method includes the step of: in the active-matrix substrate having the feature of the above fourth feature, cutting a common line having a defect due to a short circuit between the common line and a gate or source line, at both sides of the defect site outside the depressed portions of the pixel electrode.

In accordance with a sixth aspect of the invention, a defect correcting method includes the step of: in the active-matrix substrate having the feature of the above fourth feature, cutting a common line having a defect due to a short circuit between the common line and a pixel electrode, at both sides of the defect site outside the depressed portions of the pixel electrode; cutting the gate electrode of the switching element; and connecting the source electrode and drain electrode.

A seventh aspect of the invention resides an active-matrix substrate having the above first feature wherein the gate electrode of each switching element is directly connected with the gate line without a cutting portion for correction between the gate electrode and the gate line whereby the area of the switching element is reduced while the pixel electrode is enlarged by that portion.

In accordance with an eighth aspect of the invention, a defect correcting method includes the step of: in the active-matrix substrate having the feature of the above seventh feature, cutting a common line associated with a pixel electrode forming a spot defect, at both sides of the pixel electrode; and connecting the source line and the pixel electrode through the common line segment separated, whereby spot defects are corrected.

The operations of the above active-matrix substrates and their defect correcting methods will be described hereinafter.

In the active-matrix of the first feature, by providing terminals for both ends of common lines, it is possible to input common signal from either terminal of the common lines. Accordingly, in accordance with the defect correcting method of the second feature, since if a common line which is short-circuited with a gate line or source line is cut off the signal is supplied from both sides of the cutting portion, the circuitry is not affected by the cutting and the signal can be applied to auxiliary capacitance. Further, since the common line is cut off at both sides of the source line, the source line will not be affected by the common line. Accordingly, it is possible to maintain stabilized quality of display free from defects.

Further, in accordance with the defect correcting method of the third feature, since the signal is supplied from both sides of the cut portion of the common line, the auxiliary capacitance other than that of the pixel electrode will not be affected. Since the source electrode and drain electrode in the switching element is being connected, the signal from the source line is directly inputted to the pixel electrode in question. It is impossible to drive the pixel electrode in a normal way because of the lack of the auxiliary capacitance and no amplifying effect. Nevertheless, the active-matrix substrate containing the defective electrode can be driven in such a degree that spot defects such as bright spots in the normally-white mode or black spots in the normally-black mode are suppressed to inconspicuous levels.

In the active-matrix substrate of the fourth feature, depressed portions are provided for each pixel electrode at both sides thereof intersecting with the common line, so that the pixel electrode may not be damaged when it is cut by the laser beam or the like. Accordingly, in the defect correcting methods of the fifth and sixth features, since the common line is cut off at positions outside the depressed portions of the pixel electrode, there is no possibility of forming secondary defects such as a short circuit between the pixel electrode and the common line at the cutting portions.

In the active-matrix substrate having the seventh feature, there is no need for providing a cutting portion for correction between the gate electrode and the gate line in each thin-film transistor, therefore it is possible to enlarge the pixel electrode by that portion, whereby it is possible to improve the numerical aperture of the active-matrix substrate. In accordance with the defect correcting method of the eighth feature, in this active-matrix substrate the common line is cut off at both sides of the spot defect site and the source line and the pixel electrode are connected on the common line segment separated. Since the signal is inputted from both sides of the cut portions, it is possible to input the signal to each auxiliary capacitance without having any influence of the cutting. Besides, since the common line segment over the spot defect after being cut off is used to connect the source line and pixel electrode, this means functions similarly to that of the source-drain connecting correction. That is, the signal from the source line is directly impressed to the pixel electrode. Accordingly, it is possible to drive the pixel electrode in question in such a degree to make spot defects inconspicuous although it is impossible to drive the pixel as a normal one because of the lack of the auxiliary capacitance and no amplifying effect of the thin-film transistor.

DESCRIPTION OF THE PREFERRED EMBODIMENTS

Embodiments of the invention will hereinafter be described with reference to the accompanying drawings.

Figure 1:
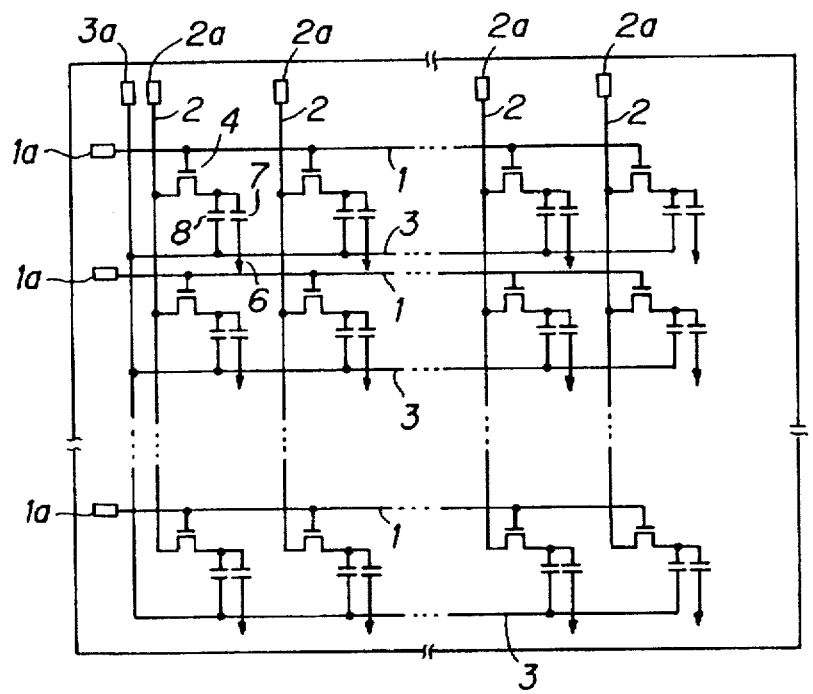
FIG. 1 is an equivalent circuit diagram showing a conventional active-matrix substrate.
Figure 2:
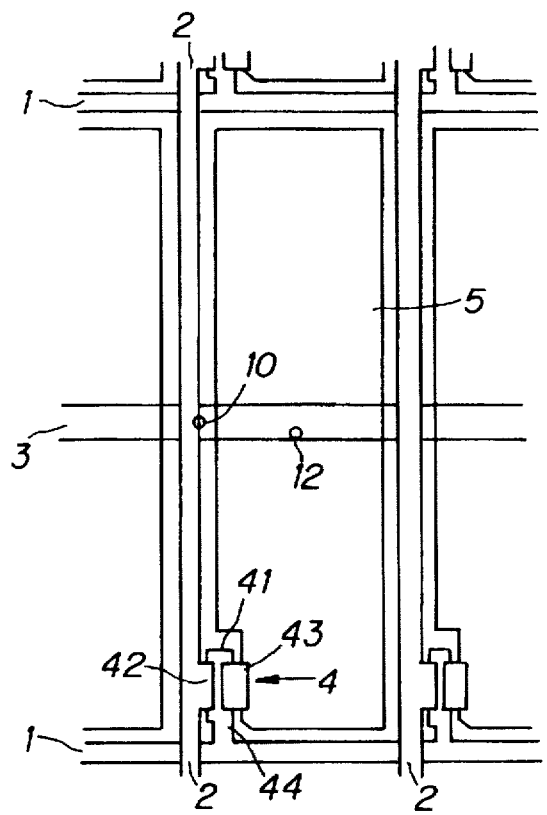
FIG. 2 is an enlarged configurational view showing an active-matrix substrate shown in FIG. 1.
Figure 3:
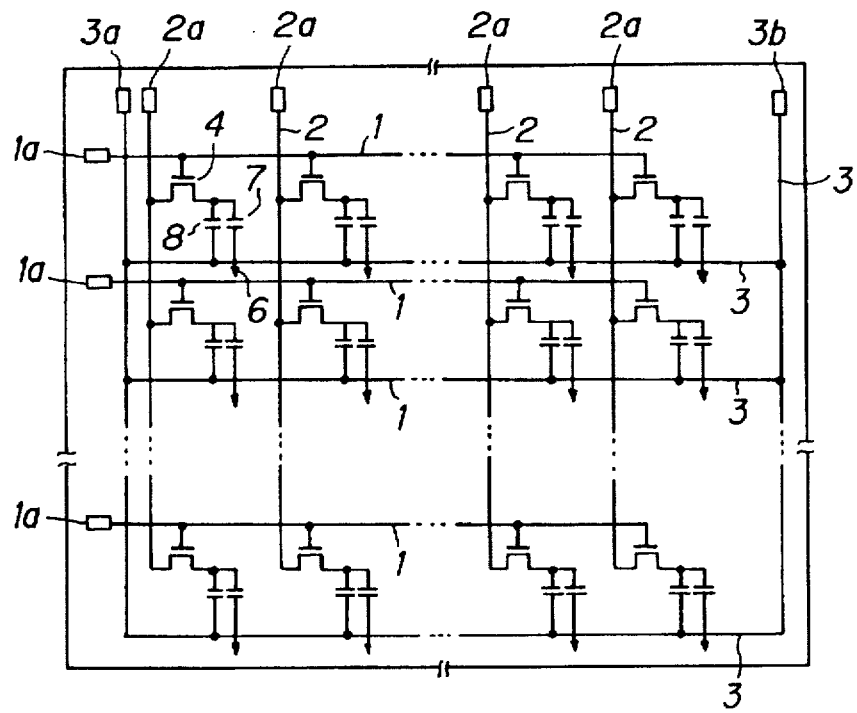
FIG. 3 is an equivalent circuit diagram showing an active-matrix substrate in accordance with the invention.
Figure 4:
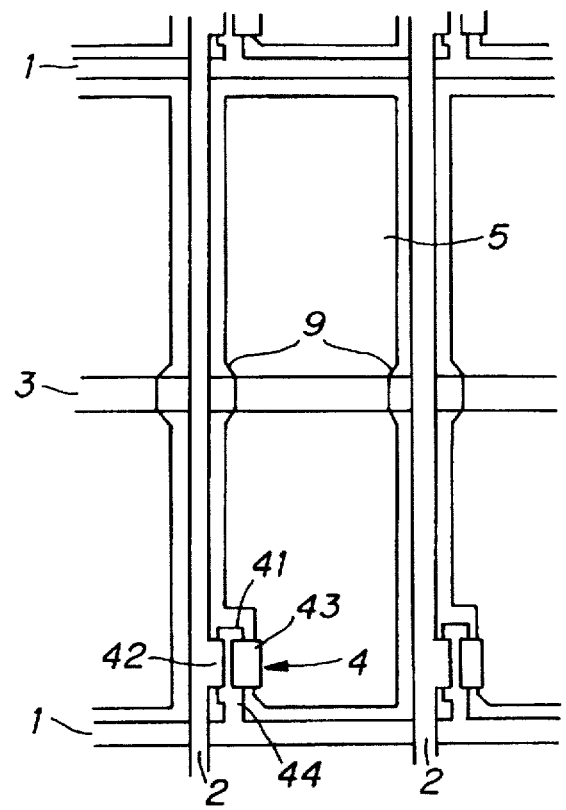
FIG. 4 is an enlarged configurational view showing an embodiment of an active-matrix substrate shown in FIG. 3.

FIG. 3 is an equivalent circuit diagram showing an active-matrix substrate in accordance with the invention. FIG. 4 is an enlarged configurational view showing an embodiment of the active-matrix substrate shown in FIG. 3. The basic structures shown in these equivalent circuit diagram and enlarged configurational view are almost the similar to those shown in FIGS.1 and 2. Therefore, the corresponding components are allotted with the same reference numerals and the detailed description of those elements will be omitted.

This embodiment is characterized by its common lines and pixel electrodes, which will be detailed hereinbelow. Common lines 3 are formed in parallel with gate lines 1 in the same manner as in FIG. 1. A line with a terminal 1a which joins those parallel lines 3 is provided in parallel with source lines 2 on the substrate edge part on the gate line terminals 1a side. In this embodiment, another line with a terminal 3b which joins the same parallel lines 3 is provided in parallel with source lines 2 on the substrate edge part on the opposite side of the gate line terminals 1a. These two terminals 3a, 3b are supplied with a signal which is identical with the common signal being applied to the opposing electrode 6. The common lines 3 are arranged to intersect gate lines 1, source lines 2 and pixel electrodes 5 with an insulator film interposed therebetween. Each pixel electrode 5 is formed with depressed portions 9 on both sides thereof where the common line 3 intersects the pixel electrode 5.

Figure 5:
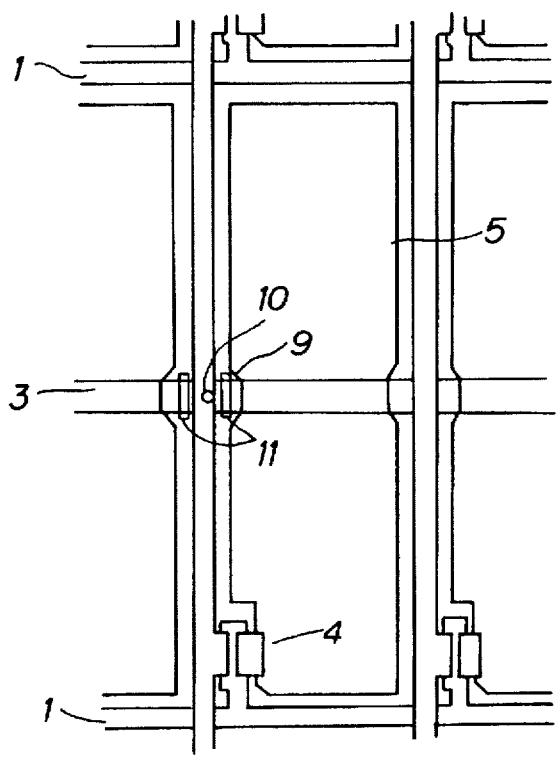
FIG. 5 is an illustrative view showing a defect correcting method of an active-matrix substrate shown in FIG. 3.

The present invention provides a correcting method of a defect arising in the intersection between a source line 2 and a common line 3 by a short circuit due to a failure of film forming. FIG. 5 is an illustration showing the defect correcting method of the active-matrix substrate of the invention. A defective site 10 occurs as a short circuit due to a failure to form a film well enough to be an insulator film at the intersection between a source line 2 and a common line 3. First, the common line 3 is cut off with a laser beam at both sides (designated at a numeral 11) of the source line 2 at this defective site 10. These cutting portions 11 are positioned outside the depressed portions 9 of the pixel electrodes 5. This means is to prevent the pixel electrodes 5 from being damaged by the laser beam or being connected to common lines 5.

The signal is inputted to the common line 3 from both the terminals 3a and 3b. Since the signal is applied to both sides of the cutting portion 11 of the common line 3, there is no influence on auxiliary capacitance 8 even when the common line 3 is cut off. Since the common line 3 is cut off at both sides of the source line 2, the source line 2 has no influence of the common line 3. Thus it is possible to correct defects due to a short circuit between the source line 2 and common line 3. Further, since one common line 3 is formed in parallel with each of the gate lines 1, it is possible for the common lines 3 to deal with defects on the respective lines. Since there is no need for providing separate lines unlike the prior art configuration with redundant lines stated above, the space will not be limited.

Although in the above description, the method of correcting a short-circuited defective between the source and common lines, it is also possible for the similar method to correct short-circuited defectives between gate and common lines.

Figure 6:
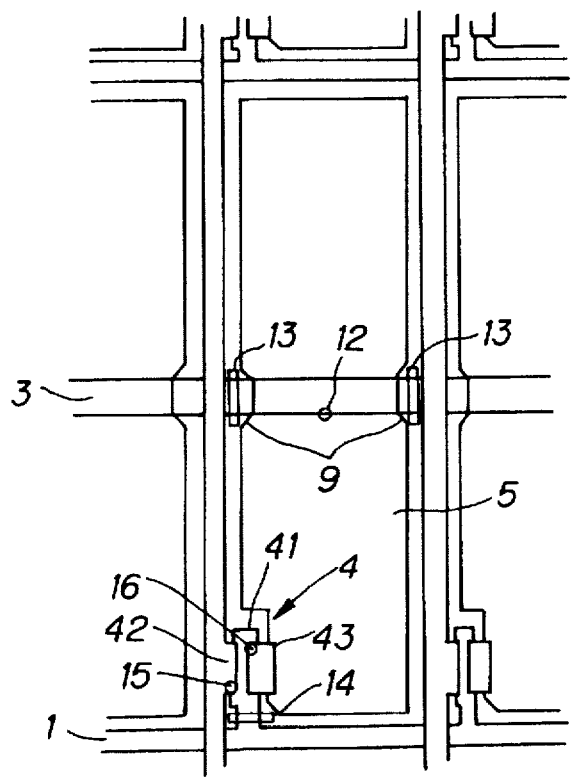
FIG. 6 is an illustrative view showing another defect correcting method of an active-matrix substrate shown in FIG. 3.

Next, description will be made regarding a correcting method of a defect arising in the intersection between a pixel electrode and a common line by a short circuit due to a failure of film forming. FIG. 6 is an illustration showing the defect correcting method of the active-matrix substrate. A defective site 12 is created by a short circuit due to a failure to form a film well enough to be an insulator film at the intersection between a common line 3 and a pixel electrode 5. The common line 3 is cut off with a laser beam at both sides (designated at a numeral 13) of the pixel electrode 5 containing this defective site 12. These cutting portions 13 are positioned outside the depressed portions 9 of the pixel electrode 5. This means is to prevent the pixel electrodes 5 from being damaged by the laser beam or being connected to common lines 5. Next, the gate electrode of the thin-film transistor 4 is cut off at a cutting portion 14 with a laser beam while laser beams are irradiated on the source electrode and drain electrode (at irradiating spots 15 and 16, respectively) in order to perform source-drain connecting correction.

As described heretofore, the signal is inputted to the common line 3 from both the terminals 3a and 3b. Since the signal is supplied from both sides of the cutting portions 13 of the common line 3, nothing is affected except the segment of the common line 3 formed over the pixel electrode 5 in question, that is, the auxiliary capacitance 8. Since the source electrode 42 and drain electrode 43 in the thin-film transistor 4 are connected, the signal from the source line 2 is directly inputted to the pixel electrode 5. Therefore the pixel electrode 5 in question cannot be driven as a normal pixel electrode because of the lack of the auxiliary capacitance 8 and no amplifying effect of the thin-film transistor 4. In spite of this, it is possible for this method to correct spot defects in the actual driver operation with the display panel provided, in such a degree that bright spots in the normally-white mode or black spots in the normally-black mode can be suppressed to inconspicuous levels.

Figure 7:
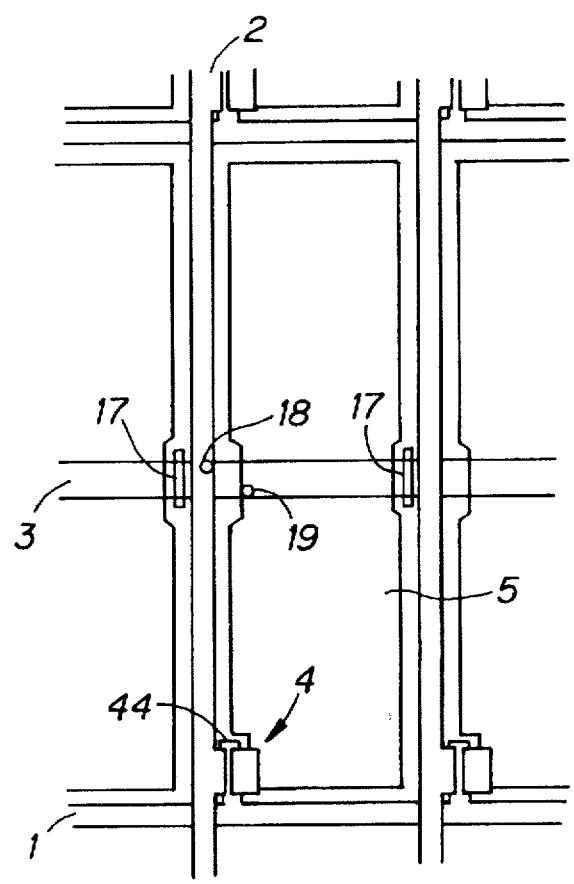
FIG. 7 is an enlarged configurational view showing another embodiment of an active-matrix substrate in FIG. 3.

FIG. 7 is an enlarged configurational view showing another embodiment of an active-matrix substrate in accordance with the invention. The basic structure of this configuration in the figure is almost similar to that of FIG. 3, the components are allotted with the same reference numerals and detailed description of those components will be omitted. This active-matrix substrate is characterized in that no depressed portion 44 as a cutting portion for correction is provided between the gate electrode 41 and gate line 1 in the thin-film transistor 4.

Next, description will be made on a correcting method of a spot defect arising due to the operation failure of a thin-film transistor 4. The common line 3 is cut off with a laser beam at both sides of the pixel electrode 5 of spot defect generated (cut at cutting sites 17). Then the source line 2 over the common line 3 (connecting site 18) and the common line 3 over the pixel electrode 5 (connecting site 9) are laser-irradiated so as to connect the common line and the source line 2 as well as to connect the pixel electrode 5 and the common line 3. Thus the source line 2 and the pixel electrode 5 are connected through the common line 3.

As described heretofore, the signal is inputted to the common line 3 from both the terminals 3a and 3b. Since the signal is supplied from both the directions up to the cutting site 17 of the common line 3, nothing is affected except the segment of the common line 3 formed over the pixel electrode 5 in question, that is, the auxiliary capacitance 8. The signal from the source line 2 is being inputted to the pixel electrode 5. The pixel electrode 5 in question cannot be driven as a normal pixel because of the lack of the auxiliary capacitance 8 and no amplifying effect of the thin-film transistor 4. In spite of this, it is possible for this method to correct spot defects in the actual driver operation with the display panel provided, in such a degree that bright spots or black spots can be suppressed to inconspicuous levels. Since correction of spot defects can be done on the common line 3 without using the source-drain connecting correction in the above way, gate electrodes of thin-film transistors 4 do not require depressed portions as to be cutting portions for correction.

Although the common lines in the active-matrix substrate is formed in parallel with the gate electrodes, the common lines may be formed in parallel with the source lines. Corrections of short-circuited defects between gate and common lines and between a common line and a pixel electrode can be performed in the same manner as described above.

In accordance with the active-matrix substrate of the invention, since the input terminals for supplying the common signal are provided on both sides of the common lines, it is possible to input the signal from both sides of the cut portion or portions if a common line which is short-circuited with a gate line or source line is cut off. Accordingly, in accordance with a defect correcting method of an active-matrix substrate of the invention, since if in the active-matrix substrate of the invention, a common line which is short-circuited with a gate line or source line is cut off the signal is supplied from both sides of the cut portion, the circuitry is not affected by the cutting and the signal can be applied to auxiliary capacitance. Further, since the common line is cut off at both sides of the source line, the source line will not be affected by the common line. Accordingly, it is possible to improve the ratio of non-defective products in the manufacture of active-matrix substrates.

In accordance with the defect correcting method of the active-matrix substrate of the invention, since if in the active-matrix substrate of the invention, a common line is cut off at both sides of a short-circuited defect between a pixel electrode and the common line the signal is supplied from both sides of the cut portion, the auxiliary capacitance other than that of the pixel electrode will not be affected. Since the source electrode and drain electrode in the switching element is being connected, the signal from the source line is directly inputted to the pixel electrode in question. In consequence it is possible to make inconspicuous, spot defects such as bright spots in the normally-white mode or black spots in the normally-black mode, to thereby improve the ratio of non-defective products.

In accordance with the active-matrix substrate of the invention, since depressed portions are provided for each of pixel electrode on both sides thereof intersecting with the common line; when the common line is cut off outside the depressed portions, it is possible to suppress the damage to the pixel electrode. Accordingly, in accordance with the defect correcting method of the active-matrix substrate of the invention, since the common line is cut off at positions outside the depressed portion of the pixel electrode, there is no possibility of forming secondary defects such as a short circuit between the pixel electrode and the common line at the cutting portions, and it is possible to improve the ratio of non-defective products.

In accordance with the active-matrix substrate of the invention, there is no need for providing a cutting portion for correction between the gate electrode and the gate line in each switching element, therefore it is possible to establish a greater area for the pixel electrode by that portion, whereby it is possible to improve the numerical aperture of the active-matrix substrate. Accordingly, in accordance with the defect correcting method of the active-matrix substrate of the invention, since in the active-matrix substrate of the invention a common line is cut off at both sides of the spot defect site and the source line and the pixel electrode are connected on the common line segment separated, the signal is inputted from both sides of the cut portions.. Accordingly, it is possible to input the signal to each auxiliary capacitance without having any influence of the cutting. Besides, since the common line segment over the spot defect after being cut off is used to connect the source line and pixel electrode, this means functions similarly to that of the source-drain connecting correction. That is, the signal from the source line is directly impressed to the pixel electrode, and it is possible to drive the pixel electrode in question in such a degree to make spot defects inconspicuous although it is impossible to drive the pixel as a normal one because of the lack of the auxiliary capacitance and no amplifying effect of the thin-film transistor. As a result, it is possible to improve the ratio of non-defective products.

What is claimed is:

1. An active-matrix substrate comprising:
    a plurality of pixel electrodes each having a switching element for driving the pixel electrode, said pixel electrodes being arranged matrix-wise;
    a plurality of gate lines and source lines arranged grid-wise so as to be connected to gate and source electrodes, respectively, of said switching elements; and
    a plurality of common lines disposed to be overlapped by the pixel electrodes at corresponding overlap positions and to form auxiliary capacitances in cooperation with corresponding pixel electrodes so that the common signal is inputted through the capacitances;
    two common terminals to which the plurality of common lines are connected, the common signal being applied to both of the two common terminals.

2. An active-matrix substrate according to claim 1 wherein depressed portions are provided for each of said pixel electrodes at the corresponding overlap position.

3. An active-matrix substrate according to claim 1 wherein the gate electrode of each switching element is directly connected with the corresponding gate line without a cutting portion for correction between the gate electrode and the gate line whereby the area of the switching element is reduced while the area of the corresponding pixel electrode is enlarged by that portion.

4. A defect correcting method of an active-matrix substrate comprising:

a plurality of pixel electrodes each having a switching element for driving the pixel electrode, said pixel electrodes being arranged matrix-wise;

a plurality of gate lines and source lines arranged grid-wise so as to be connected to gate and source electrodes, respectively, of said switching elements; and a plurality of common lines disposed to be overlapped by the pixel electrodes at corresponding overlap positions and to form auxiliary capacitances in cooperation with corresponding pixel electrodes so that the common signal is inputted through the capacitances, said defect correcting method including the steps of: in said active-matrix substrate, cutting a common line having a defect due to a short circuit between the common line and a selected pixel electrode, at both sides of the defect site; and applying a common signal to two terminals, the two terminals being connected to the plurality of common lines whereby the cutting of the common line having the defect does not affect the auxiliary capacitance associated with the selected pixel electrode.

5. A defect correcting method of an active-matrix substrate comprising:

a plurality of pixel electrodes each having a switching element for driving the pixel electrode, said pixel electrodes being arranged matrix-wise;

a plurality of gate lines and source lines arranged grid-wise so as to be connected to gate and source electrodes, respectively, of said switching elements; and a plurality of common lines disposed to be overlapped by the pixel electrodes at corresponding overlap positions and to form auxiliary capacitances in cooperation with corresponding pixel electrodes so that the common signal is inputted through the capacitances, wherein said common lines are joined in both ends to respective terminals to which the common signal is inputted, said defect correcting method including the steps of: in said active-matrix substrate, cutting a common line having a defect due to a short circuit between the common line and a selected pixel electrode, at both sides of the defect site;

cutting the gate electrode of the switching element for the selected pixel electrode; and connecting the source electrode and a drain electrode of the switching element for the selected pixel electrode.

6. A defect correcting method of an active-matrix substrate comprising:

a plurality of pixel electrodes each having a switching element for driving the pixel electrode, said pixel electrodes being arranged matrix-wise;

a plurality of gate lines and source lines arranged grid-wise so as to be connected to gate and source electrodes, respectively, of said switching elements; and a plurality of common lines disposed to be overlapped by the pixel electrodes at corresponding overlap positions and to form auxiliary capacitances in cooperation with corresponding pixel electrodes so that the common signal is inputted through the capacitances, wherein said common lines are joined in both ends to respective terminals to which the common signal is inputted, and depressed portions are provided for each of said pixel electrodes at the corresponding overlap position, said defect correcting method including the step of: in said active-matrix substrate, cutting a common line having a defect due to a short circuit between the common line and a gate or source line, at both sides of the defect site outside said depressed portions of a selected pixel electrode close to said defect.

7. A defect correcting method of an active-matrix substrate comprising:

a plurality of pixel electrodes each having a switching element for driving the pixel electrode, said pixel electrodes being arranged matrix-wise;

a plurality of gate lines and source lines arranged grid-wise so as to be connected to gate and source electrodes, respectively, of said switching elements; and a plurality of common lines disposed to intersect said gate lines, source lines or pixel electrodes and to form auxiliary capacitances in cooperation with corresponding pixel electrodes so that the common signal is inputted through the capacitances, wherein said common lines are joined in both ends to respective terminals to which the common signal is inputted, and depressed portions are provided for each of said pixel electrodes at a position thereof intersecting with a common line, said defect correcting method including the steps of: in said active-matrix substrate, cutting a common line having a defect due to a short circuit between the common line and a selected pixel electrode, at both sides of the defect site outside said depressed portions of the selected pixel electrode; and connecting the source electrode and a drain electrode of the switching element for the selected pixel electrode.

8. A defect correcting method of an active-matrix substrate comprising:

a plurality of pixel electrodes each having a switching element for driving the pixel electrode, said pixel electrodes being arranged matrix-wise;

a plurality of gate lines and source lines arranged grid-wise so as to be connected to gate and source electrodes, respectively, of said switching elements; and a plurality of common lines disposed to intersect said gate lines, source lines or pixel electrodes and to form auxiliary capacitances in cooperation with corresponding pixel electrodes so that the common signal is inputted through the capacitances, wherein said common lines are joined in both ends to respective terminals to which the common signal is inputted, and the gate electrode of each switching element is directly connected with the corresponding gate line without a cutting portion for correction between the gate electrode and the gate line whereby the area of the switching element is reduced while the area of the corresponding pixel electrode is enlarged by that portion, said defect correcting method including the steps of: in said active-matrix substrate, cutting a common line associated with a pixel electrode forming a spot defect, at both sides of the pixel electrode; and connecting the source line connected to the switching element associated with the pixel electrode and the pixel electrode through the common line segment separated, whereby spot defects are corrected.

9. An active-matrix substrate comprising:

a plurality of pixel electrodes each having a switching element for driving the pixel electrode, said pixel electrodes being arranged matrix-wise;

a plurality of gate lines and source lines arranged gridwise so as to be connected to gate and source electrodes, respectively, of the switching elements;

a plurality of common lines disposed to have at least portions thereof overlapped by at least some of the pixel electrodes at overlap positions;

the pixel electrodes each having a reduced width region at the overlap position, the reduced width region being in a direction in which the common line extends at the overlap position.

10. The active-matrix substrate of claim 9, wherein the plurality of common lines have at least two terminals to which a common signal can be inputted.

* * * * *